United States Patent
Miyasaka

(10) Patent No.: US 7,127,089 B2
(45) Date of Patent: *Oct. 24, 2006

(54) ELECTROSTATIC CAPACITANCE DETECTION DEVICE

(75) Inventor: Mitsutoshi Miyasaka, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 754 days.

This patent is subject to a terminal disclaimer.

(21) Appl. No.: 10/375,111

(22) Filed: Feb. 28, 2003

(65) Prior Publication Data

US 2003/0222659 A1    Dec. 4, 2003

(30) Foreign Application Priority Data

Mar. 4, 2002  (JP) .............................. 2002-058071

(51) Int. Cl.
*G06K 9/00* (2006.01)
*G01R 27/26* (2006.01)

(52) U.S. Cl. ...................................... 382/124; 324/662

(58) Field of Classification Search ................ 382/103, 382/124; 324/658, 662, 686, 661
See application file for complete search history.

(56) References Cited

U.S. PATENT DOCUMENTS

| | | | |
|---|---|---|---|
| 4,429,413 A | | 1/1984 | Edwards |
| 6,411,727 B1 * | | 6/2002 | Harkin ........................ 382/124 |
| 6,438,257 B1 * | | 8/2002 | Morimura et al. .......... 382/124 |
| 6,448,790 B1 * | | 9/2002 | Imai ............................ 324/661 |
| 6,657,269 B1 * | | 12/2003 | Migliorato et al. ......... 257/414 |
| 6,714,666 B1 * | | 3/2004 | Morimura et al. .......... 382/124 |

FOREIGN PATENT DOCUMENTS

| | | |
|---|---|---|
| EP | 1 041 356 A1 | 10/2000 |
| JP | A-11-118415 | 4/1999 |
| JP | A 11-508806 | 8/1999 |
| JP | A-11-312811 | 11/1999 |
| JP | A-2000-346608 | 12/2000 |
| JP | A 2000-346610 | 12/2000 |
| JP | A-2001-56204 | 2/2001 |
| JP | A-2001-133213 | 5/2001 |
| JP | A 2001-311752 | 11/2001 |
| JP | A 2001-358155 | 12/2001 |
| WO | WO 97/40744 | 11/1997 |
| WO | WO 98/52135 | 11/1998 |

OTHER PUBLICATIONS

Utsunomiya et al., "Low Temperature Poly-Si TFTs on Plastic Substrate Using Surface Free Technology by Laser Ablation/Annealing (SUFTLA™)", *Society for Information Display SID Digest*, 2000, pp. 916-919.

Hashido et al., "A Capacitive Fingerprint Sensor with Low-Temperature poly-Si TFTs", *IEEE International Solid-State Circuits Conference*, 2001, pp. 250-251.

* cited by examiner

*Primary Examiner*—Daniel Miriam
(74) *Attorney, Agent, or Firm*—Oliff & Berridge PLC

(57) ABSTRACT

The invention provides a superior electrostatic capacitance detection device. An electrostatic capacitance detection device includes an M number of individual power-supply lines and an N number of individual output lines arranged in a matrix of M rows and N columns, and an electrostatic capacitance detecting element formed at the intersection thereof. The electrostatic capacitance detecting element includes a signal detection element and a signal amplifying element. The signal detection element includes a capacitance detecting electrode and a capacitance detecting dielectric layer. The signal amplifying element includes an MIS thin-film semiconductor device for signal amplification, including a gate electrode, a gate insulator, and a semiconductor layer.

18 Claims, 6 Drawing Sheets

ELECTROSTATIC CAPACITANCE DETECTION DEVICE

BACKGROUND OF THE INVENTION

1. Field of Invention

The present invention relates to an electrostatic capacitance detection device that reads the surface contours of a fingerprint or other target object having extremely small ridges and valleys, by detecting electrostatic capacitance, which changes according to a distance from the surface of the target object.

2. Description of Related Art

As described in Japanese Laid Open to the Public No. Hei 11-118415, No. Hei 2000-346608, No. Hei 2001-56204, No. Hei 2001-133213, in electrostatic capacitance detection devices of the related art that are used in fingerprint sensors and so forth, a sensor electrode and a dielectric layer deposited on the sensor electrode are formed on a single-crystal silicon wafer. The principle of operation of an electrostatic capacitance detection device of the related art is shown in FIG. 1. One of a pair of electrodes in a capacitor is a sensor electrode the other is grounded to a human. Further, a dielectric layer is formed on the uppermost surface of the electrostatic capacitance detection device. The capacitance $C_F$ of this capacitor changes according to the ridges and valleys in a fingerprint contacting the surface of the dielectric layer. On the other hand, the semiconductor substrate is equipped with a capacitor that forms an electrostatic capacitance $C_s$. These two capacitors are connected in series, and a predetermined voltage is applied. The application of a voltage causes a charge Q corresponding to the ridges and valleys in a fingerprint to be formed between the two capacitors. This charge Q is sensed using ordinary semiconductor technology and the surface contours of the target object are read.

SUMMARY OF THE INVENTION

However, the electrostatic capacitance detection devices of the related art are formed on a single-crystal silicon wafer. Hence, they are fragile and subject to breaking when too much finger pressure is applied when they are used as a fingerprint sensor.

In addition, fingerprint sensors, because of the application, need to be approximately 20 mm×20 mm in size. The majority of the area of the electrostatic capacitance detection device is occupied by the sensor electrodes. The sensor electrodes are, of course, formed on a single-crystal silicon wafer, yet the majority of the single-crystal silicon wafer (the lower sensor electrode), the creation of which requires enormous energy and labor, serves as nothing more than a supporting member. In other words, the electrostatic capacitance detection devices of the related art are not only expensive, but they are also formed at huge waste and expense.

Moreover, in the related art, it has been strongly suggested that personal identification functions be provided on cards, such as credit cards and bank cards, to increase card security. However, electrostatic capacitance detection devices of the related art that are made on a single-crystal silicon wafer lack flexibility, and therefore cannot be formed on a plastic substrate.

Thus, the present invention provides a superior electrostatic capacitance detection device that operates stably, can reduce the expenditure of unnecessary energy and labor during manufacture, and can be made on a substrate other than a single-crystal silicon wafer.

An electrostatic capacitance detection device of the present invention that reads surface contours of a target object by detecting electrostatic capacitance which changes according to a distance from the target object, includes: an M number of individual power-supply lines and an N number of individual output lines arranged in a matrix of M rows and N columns; and an electrostatic capacitance detecting element formed at the intersections between the individual power-supply lines and the individual output lines. The electrostatic capacitance detecting element includes a signal detection element and a signal amplifying element. The signal detection element includes a capacitance detecting electrode and a capacitance detecting dielectric layer. The signal amplifying element includes an MIS thin-film semiconductor device for signal amplification, including a gate electrode, a gate insulator, and a semiconductor layer.

In addition, the present invention further includes a source region of the MIS thin-film semiconductor device for signal amplification connected to an individual output line, a drain region of the MIS thin-film semiconductor device for signal amplification connected to an individual power-supply line, and a signal-amplifying gate electrode connected to the capacitance detecting electrode.

Further, in the present invention, an element capacitance $C_D$ is sufficiently larger than a transistor capacitance $C_T$, when the transistor capacitance $C_T$ of the MIS thin-film semiconductor device for signal amplification is defined by the equation:

$$C_T = \epsilon_0 \cdot \epsilon_{ox} \cdot L \cdot W / t_{ox}$$

where L (μm) is the gate electrode length, W (μm) is the gate electrode width of the MIS thin-film semiconductor device for signal amplification, $t_{ox}$ (μm) is the gate insulator thickness, $\epsilon_{ox}$ is the dielectric constant of the gate insulator, and $\epsilon_0$ is the permittivity in vacuum; and when the element capacitance $C_D$ of the signal detecting element is defined by the equation:

$$C_D = \epsilon_0 \cdot \epsilon_D \cdot S / t_D$$

where S (μm²) is the area of the capacitance detecting electrode, $t_D$ (μm) is the thickness of the capacitance detecting dielectric layer, $\epsilon_D$ is the dielectric constant of the capacitance detecting dielectric layer, and $\epsilon_0$ is the permittivity in vacuum.

In general, "sufficiently larger" means a difference in magnitude of about 10 times or greater. In other words, therefore, the element capacitance $C_D$ and the transistor capacitance $C_T$ satisfy the following relationship:

$$C_D > 10 \times C_T$$

In the electrostatic capacitance detection device of the present invention, the capacitance detecting dielectric layer is preferably located on the uppermost surface of the electrostatic capacitance detection device. In the electrostatic capacitance detection device, the target object is not in contact with the capacitance detecting dielectric layer, and instead is separated from the capacitance detecting dielectric layer by target object distance $t_A$. Further, the aforesaid transistor capacitance $C_T$ is sufficiently larger than a target object capacitance $C_A$, when the target object capacitanec $C_A$ is defined by the equation:

$$C_A = \epsilon_0 \cdot \epsilon_A \cdot S / t_A$$

where $\epsilon_0$ is the permittivity in vacuum, $\epsilon_A$ is the dielectric constant of air, and S is the area of the capacitance detecting electrode. As stated above, a difference in magnitude of about 10 times or greater is said to be sufficiently large. Hence, in the present invention, the transistor capacitance $C_T$ and the target object capacitance $C_A$ satisfy the following relationship:

$$C_T > 10 \times C_A$$

More ideally, in the present invention, the capacitance detecting dielectric layer is located on the uppermost surface of the electrostatic capacitance detection device; the element capacitance $C_D$ is sufficiently larger than the transistor capacitance $C_T$, the transistor capacitance $C_T$ of the MIS thin-film semiconductor device for signal amplification is defined by the equation:

$$C_T = \epsilon_0 \cdot \epsilon_{ox} \cdot L \cdot W / t_{ox}$$

where L (μm) is the gate electrode length, W (μm) is the gate electrode width of the MIS thin-film semiconductor device for signal amplification, $t_{ox}$ (μm) is the thickness of the gate insulator, and $\epsilon_{ox}$ is the dielectric constant of the gate insulator, and $\epsilon_0$ is the permittivity in vacuum;

the element capacitance $C_D$ of the signal detection element is defined by the equation:

$$C_D = \epsilon_0 \cdot \epsilon_D \cdot S / t_D$$

where S (μm$^2$) is the capacitance detecting electrode area, $t_D$ (μm) is the thickness of the capacitance detecting dielectric layer, $\epsilon_D$ is the dielectric constant of the capacitance detecting dielectric layer, and $\epsilon_0$ is the permittivity in vacuum; the target object is not in contact with the capacitance detecting dielectric layer but is separated from the capacitance detecting dielectric layer by the target object distance $t_A$; and the transistor capacitance $C_T$ is sufficiently larger than the target object capacitance $C_A$, when the target object capacitance $C_A$ is defined by the equation:

$$C_A = \epsilon_0 \cdot \epsilon_A \cdot S / t_A$$

where $\epsilon_0$ is the permittivity in vacuum, $\epsilon_A$ is the dielectric constant of air, and S is the capacitance detecting electrode area.

More specifically, in the present invention, the element capacitance $C_D$ and the transistor capacitance $C_T$ satisfy the following relationship:

$$C_D > 10 \times C_T > 100 \times C_A$$

An electrostatic capacitance detection device of the present invention that reads surface contours of a target object by detecting electrostatic capacitance which changes according to the distance from the target object, includes: an M number of individual power-supply lines and an N number of individual output lines arranged in a matrix of M rows and N columns; an electrostatic capacitance detecting element formed at the intersections between the individual power-supply lines and individual output lines; and, a power-supply selecting circuit connected to the M number of individual power-supply lines. The electrostatic capacitance detecting element includes a capacitance detecting electrode, a capacitance detecting dielectric layer, and a signal amplifying element. The power-supply selecting circuit includes a common power-supply line and a power-supply pass-gate. The signal amplifying element includes an MIS thin-film semiconductor device for signal amplification, including a gate electrode, a gate insulator, and a semiconductor layer. The power-supply pass-gate includes a thin-film semiconductor device for a power-supply pass-gate, including a gate electrode, a gate insulator, and a semiconductor layer.

Herein, the present invention further includes a source region of the MIS thin-film semiconductor device for signal amplification connected to an individual output line; a drain region of the MIS thin-film semiconductor device for signal amplification connected to an individual power-supply line; the gate electrode of the MIS thin-film semiconductor device for signal amplification connected to a capacitance detecting electrode; a source region of the thin-film semiconductor device for a power-supply pass-gate connected to an individual power-supply line; and a drain region of the thin-film semiconductor device for a power-supply pass-gate connected to the common power-supply line.

In addition, the gate electrode of the thin-film semiconductor device for a power-supply pass-gate is connected to an output line for power-supply selection supplying a signal that determines which individual power-supply line is selected from the M number of individual power-supply lines.

In an electrostatic capacitance detection device of the present invention, an individual output line and an output line for power-supply selection are electrically connected by a first wire; an individual power-supply line and the common power-supply line are electrically connected by a second wire; and the first wire and the second wire are electrically isolated from one another by an insulator. The capacitance detecting electrode is electrically connected either by the first wire or by the second wire.

An electrostatic capacitance detection device of the present invention that reads the surface contours of a target object by detecting electrostatic capacitance which changes according to the distance from the target object, includes: an M number of individual power-supply lines and an N number of individual output lines arranged in a matrix of M rows and N columns; an electrostatic capacitance detecting element formed at the intersection between an individual power-supply line and an individual output line; and an output signal selecting circuit connected to N number of individual output lines. The electrostatic capacitance detecting element includes a capacitance detecting electrode, a capacitance detecting dielectric layer, and a signal amplifying element. The output signal selecting circuit includes a common output line and an output-signal pass-gat. The signal amplifying element includes an MIS thin-film semiconductor device for signal amplification, including a gate electrode, a gate insulator, and a semiconductor layer. The output-signal pass-gate includes an MIS thin-film semiconductor device for an output-signal pass-gate, including a gate electrode, a gate insulator, and a semiconductor layer.

Herein, the present invention further includes a source region of the MIS thin-film semiconductor device for signal amplification connected to an individual output line; a drain region of the MIS thin-film semiconductor device for signal amplification connected to an individual power-supply line; the gate electrode of the MIS thin-film semiconductor device for signal amplification connected to a capacitance detecting electrode; the source region of the MIS thin-film semiconductor device for an output-signal pass-gate connected to a common output line; and the drain region of the MIS thin-film semiconductor device for an output-signal pass-gate connected to an individual output line.

In addition, the gate electrode of the MIS thin-film semiconductor device for an output-signal pass-gate is connected to an output line for output selection supplying a signal that determines which individual output line is selected from the N number of individual output lines.

In the electrostatic capacitance detection device of the present invention, an individual output line and a common output line are electrically connected by a first wire; an individual power-supply line and an output line for output selection are electrically connected by a second wire; and the first wire and the second wire are electrically isolated from one another by an insulator. The capacitance detecting electrode is electrically connected either by the first wire or by the second wire.

An electrostatic capacitance detection device of the present invention that reads the surface contours of a target object by detecting electrostatic capacitance which changes according to the distance from the target object, includes: an M number of individual power-supply lines and an N number of individual output lines arranged in a matrix of M rows and N columns; an electrostatic capacitance detecting element formed at the intersection between the individual power-supply lines and the individual output lines; and a power-supply selecting circuit connected to M number of individual power-supply lines, and an output signal selecting circuit connected to N number of individual output lines. The electrostatic capacitance detecting element includes a capacitance detecting electrode, a capacitance detecting dielectric layer, and a signal amplifying element. The power-supply selecting circuit includes a common power-supply line and a power-supply pass-gate. The output signal selecting circuit includes a common output line and an output-signal pass-gate. The signal amplifying element includes an MIS thin-film semiconductor device for signal amplification, including a gate electrode, a gate insulator, and a semiconductor layer. The power-supply pass-gate includes a thin-film semiconductor device for a power-supply pass-gate, including a gate electrode, a gate insulator, and a semiconductor layer; and the output-signal pass-gate includes an MIS thin-film semiconductor device for an output-signal pass-gate, including a gate electrode, a gate insulator, and a semiconductor layer.

Herein, the present invention further includes a source region of the MIS thin-film semiconductor device for signal amplification connected to an individual output line; the drain region of the MIS thin-film semiconductor device for signal amplification connected to the individual power-supply line; the gate electrode of the MIS thin-film semiconductor device for signal amplification connected to the capacitance detecting electrode; the source region of the MIS thin-film semiconductor device for a power supply pass-gate connected to an individual power-supply line; the drain region of the MIS thin-film semiconductor device for a power supply pass-gate connected to a common power-supply line; the source region of the MIS thin-film semiconductor device for an output-signal pass-gate connected to the common output line; and the drain region of the MIS thin-film semiconductor device for an output-signal pass-gate connected to an individual output line.

In addition, a gate electrode of the thin-film semiconductor device for a power-supply pass-gate is connected to an output line for power-supply selection that determines which individual power-supply line is selected from the M number of individual power-supply lines; and a gate electrode of the MIS thin-film semiconductor device for an output-signal pass-gate is connected to an output line for output selection that determines which individual output line is selected from the N number of individual output lines.

In the electrostatic capacitance detection device of the present invention, an individual output line, common output line, and output line for power-supply selection are electrically connected by a first wire; an individual power-supply line, common power-supply line, and output line for output selection are electrically connected by a second wire; and the first wire and the second wire are electrically isolated from one another by an insulator.

The capacitance detecting electrode may be electrically connected either by the first wire or by the second wire.

DETAILED DESCRIPTION OF PREFERRED EMBODIMENTS

The present invention provides an electrostatic capacitance detection device that reads the surface contours of a target object by detecting electrostatic capacitance which changes according to the distance from a target object. The electrostatic capacitance detection device is formed as an MIS thin-film semiconductor device including a metal-insulator-semiconductor layer. Since they are ordinarily fabricated on inexpensive glass substrates, thin-film semiconductor devices are generally known in the related art for their usefulness in inexpensively fabricating semiconductor integrated circuits that require a large area, specifically devices such as liquid crystal display devices. Therefore, fabricating thin-film semiconductor devices for use as an electrostatic capacitance detection device in a fingerprint sensor, for example, obviates the need to use an expensive substrate, such as a single-crystal silicon wafer, whose production consumes tremendous energy. Instead, the device can be fabricated inexpensively on glass without wasting precious global resources. In addition, a semiconductor integrated circuit made up of a thin-film semiconductor device can be fabricated on a plastic substrate by applying the transfer technology disclosed in Japanese Laid Open to the Public No. Hei 11-312811 and by S. Utsunomiya et. al in *Society for Information Display*, p. 916 (2000). Therefore, such electrostatic capacitance detection devices do not have to be produced on a single-crystal silicon wafer, and instead can also be formed on a plastic substrate.

Figure 1:
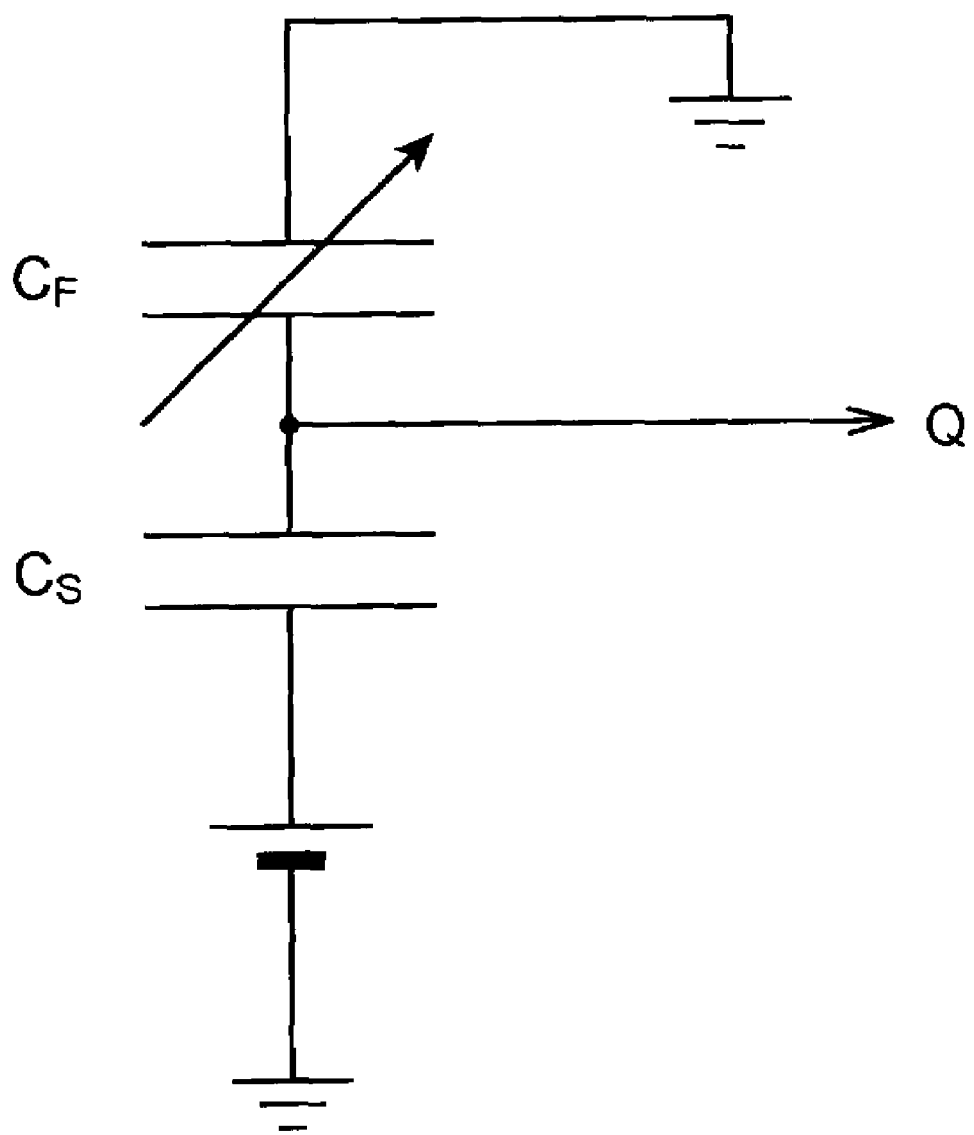
FIG. 1 is a schematic illustrating the principle of operation in a related art technology.
Figure 2:
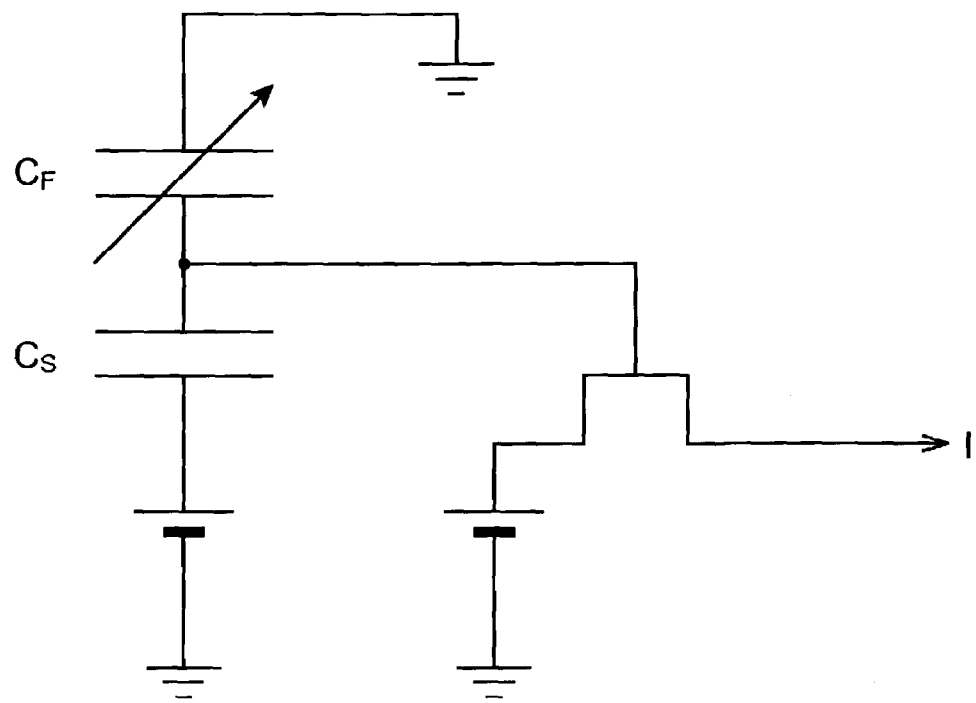
FIG. 2 is a schematic illustrating the principle of operation in the present invention.

As shown in FIG. 1, using a thin-film semiconductor device to produce an electrostatic capacitance detection device that operates on related art principles is impossible with the related art thin-film semiconductor device technology. The charge Q that is induced between two capacitors connected in series is extremely small. The charge Q can be read if single-crystal silicon LSI technology, which enables high-accuracy detecting, is used. However, the charge Q cannot be accurately read with a thin-film semiconductor device. This is because the transistor characteristics in a thin-film semiconductor are not as good as the transistor characteristics obtained with single-crystal silicon LSI technology, and, moreover, because there is a large degree of deviation in characteristics between thin-film semiconductor devices. Therefore, the electrostatic capacitance detection device of the present invention has M number (M is an integer of 1 or more) of individual power-supply lines and N number (N is an integer of 1 or more) of individual output lines arranged in a matrix of M rows and N columns. An electrostatic capacitance detecting element is formed at the intersection between an individual power-supply line and an individual output line. The electrostatic capacitance detecting element includes a signal detection element and a signal amplifying element. The signal detection element includes a capacitance detecting electrode and a capacitance detecting dielectric layer. The charge Q is produced in the capacitance detecting electrode in response to an electrostatic capacitance. In the present invention, this charge Q is amplified by the signal amplifying element formed within each electrostatic capacitance detecting element and is converted to current. Specifically, the signal amplifying element includes an MIS thin-film semiconductor device for signal amplification, including a gate electrode, a gate insulator, and a semiconductor layer. The gate electrode of the MIS thin-film semiconductor device for signal amplification is connected to the capacitance detecting electrode. The operating principle of the present invention is shown in FIG. 2. A charge occurring between a capacitor having an electrostatic capacitance $C_s$ and a capacitor having an electrostatic capacitance $C_F$, which changes according to the surface contours of a target object, changes the gate potential of the MIS thin-film semiconductor device for signal amplification. Thus, if a predetermined voltage is applied to the drain region of this thin-film semiconductor device, the current I that flows between the source and the drain of the thin-film semiconductor device in proportion to the induced charge Q is markedly amplified. The induced charge Q itself does not flow elsewhere but is retained. Hence, the measurement of the current I is also facilitated by raising drain voltage or by extending the length of measuring time and so forth. Consequently, the surface contours of a target object can be measured with sufficient accuracy even if a thin-film semiconductor device is used.

Figure 3:
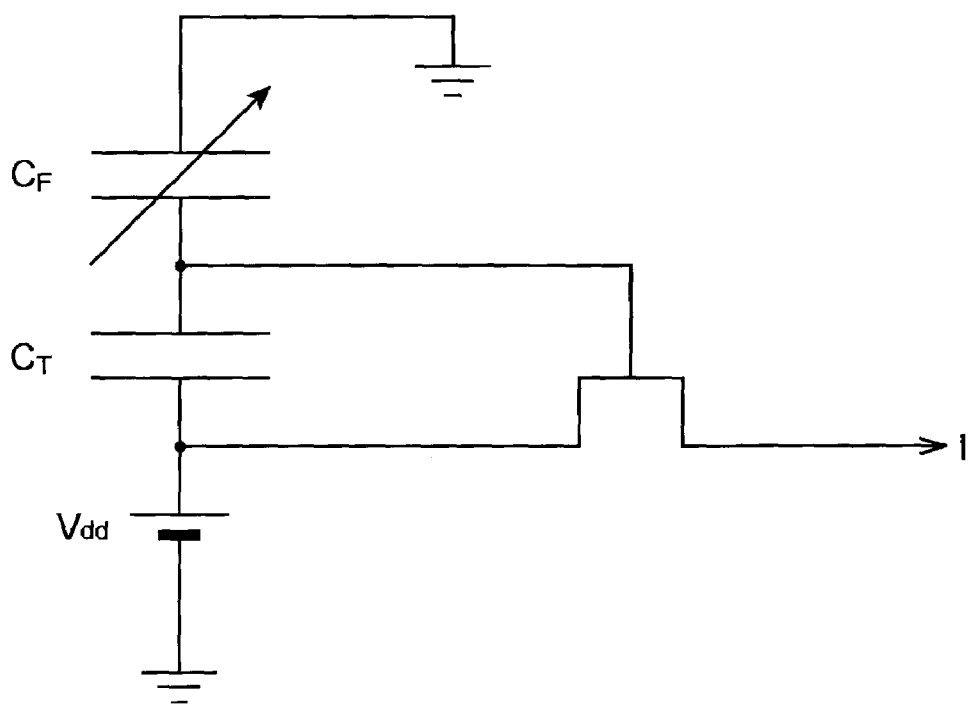
FIG. 3 is a schematic illustrating the principle of operation in the present invention.

As mentioned above, in the present invention an MIS thin-film semiconductor device for signal amplification is used as the signal-amplifying element. In this case, the MIS thin-film semiconductor device for signal amplification itself can also serve as a capacitor having an electrostatic capacitance $C_S$. In other words, the transistor capacitance $C_T$ of the MIS thin-film semiconductor device for signal amplification serves as a new electrostatic capacitance in place of the electrostatic capacitance $C_s$. Such a design enables a capacitor having electrostatic capacitance $C_S$ to be eliminated from the electrostatic capacitance detecting element. Not only does this simplify the structure, it also makes the fabrication process easier. In addition, consolidating the two power supplies depicted in FIG. 2 into a common power supply $V_{dd}$ is an effective way to eliminate superfluous wires within an electrostatic capacitance detection device. The equivalent circuit diagram for the principle of operation in this condition is shown in FIG. 3. A capacitor having an electrostatic capacitance $C_F$, which changes according to the surface contours of the target object, and a capacitor having the transistor capacitance $C_T$ are connected in series. Strictly speaking, the transistor capacitance $C_T$ is an electrostatic capacitance that is formed between the drain electrode and gate electrode of the MIS thin-film semiconductor device for signal amplification. To realize the configuration of FIG. 3, it is sufficient to connect the source region of the MIS thin-film semiconductor device for signal amplification to an individual output line and to connect the drain region of an MIS thin-film semiconductor device for signal amplification to an individual power-supply line, whereupon a voltage $V_{dd}$ is applied to the individual power-supply line, and a current I, which changes according to the surface contours of the target object, is extracted.

Figure 4:
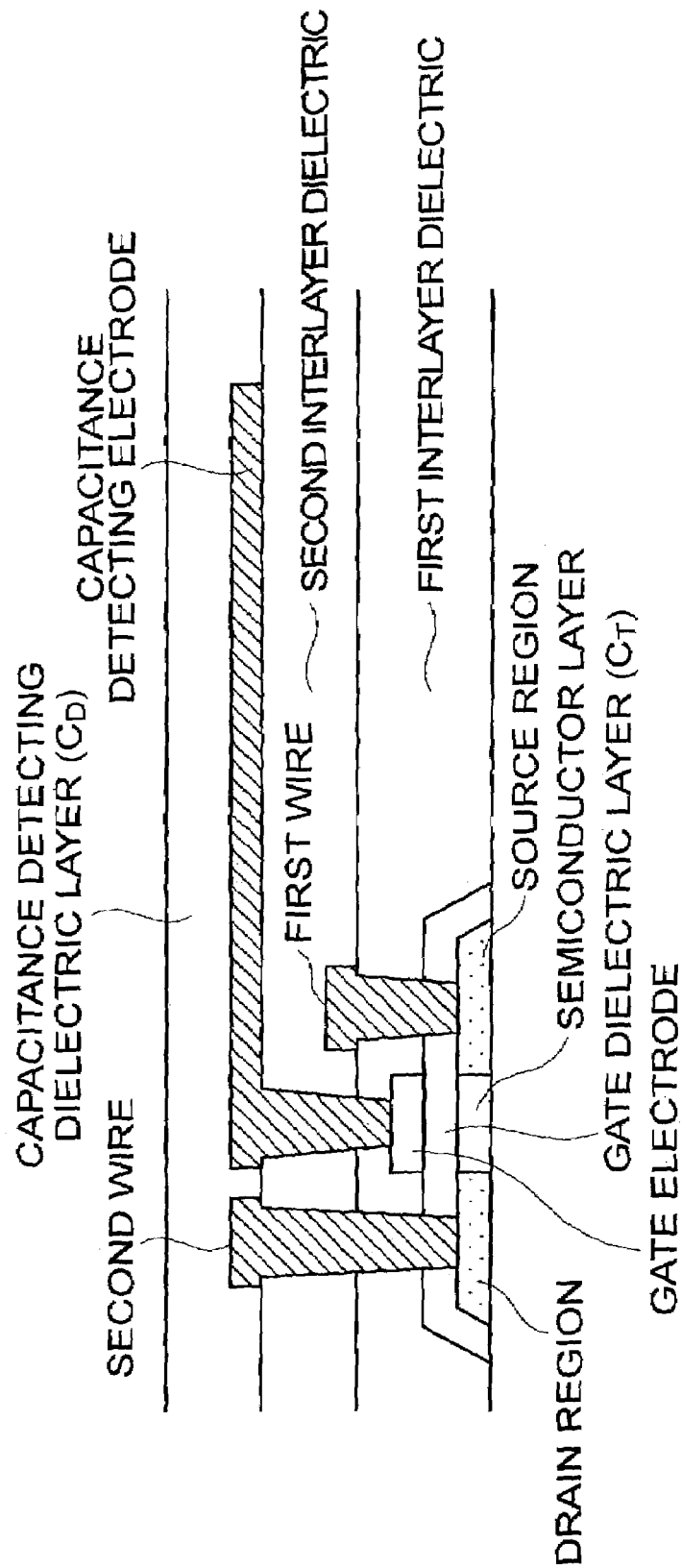
FIG. 4 is a schematic illustrating the principle of the present invention.

A structure of an electrostatic capacitance detecting element that embodies an exemplary embodiment of this invention is explained with reference to FIG. 4. In the MIS thin-film semiconductor device for signal amplification including the signal amplifying element of the electrostatic capacitance detecting element, essential structures are a gate insulator, a gate electrode, and a semiconductor layer that includes a source region, a channel formation region, and a drain region. In the sample structure depicted in FIG. 4, the MIS thin-film semiconductor device for signal amplification is covered by a first interlayer dielectric. A first wire is connected to the source region of the MIS thin-film semiconductor device for signal amplification, and a second wire is connected to the drain region. A second interlayer dielectric is formed between the first wire and the second wire to electrically isolate the first wire and the second wire from one another. The capacitance detecting electrode, which is formed by the signal detection element of the electrostatic capacitance detection element, is connected to the gate electrode of the MIS thin-film semiconductor device for signal amplification and is formed on top of the second interlayer dielectric. The capacitance detecting electrode is covered by a capacitance detecting dielectric layer. The capacitance detecting dielectric layer is located on the uppermost surface of the electrostatic capacitance detection device. The capacitance detecting dielectric layer simultaneously serves as a passivation layer for the electrostatic capacitance detection device. In FIG. 4, the capacitance detecting electrode is formed by the second wire, but the capacitance detecting electrode may also be formed by the first wire. If the capacitance detecting electrode in the structure of FIG. 4 is formed by the first wire, the second interlayer dielectric and the layer labeled as being a capacitance detecting dielectric layer in FIG. 4 will become the actual capacitance detecting dielectric layer. In addition, the capacitance detecting electrode may also be formed by the first wire, by forming the second wire atop the first interlayer dielectric and by forming the first wire atop the second interlayer dielectric.

In order for the MIS thin-film semiconductor device for signal amplification of the present invention to effectively amplify a signal when the device has the aforementioned structure, the transistor capacitance $C_T$ of the MIS thin-film semiconductor device for signal amplification and the element capacitance $C_D$ of the signal detection element must be appropriately set. These will be explained below, with reference to FIGS. 5A and 5B.

First, a situation will be considered where the ridges of an object to be measured are in contact with the capacitance detecting dielectric layer, and the target object is electrically grounded. Specifically, a situation is assumed where the ridges of a fingerprint that is in contact with the surface of the electrostatic capacitance detection device are detected. The transistor capacitance $C_T$ of the MIS thin-film semiconductor device for signal amplification is defined by the equation:

$$C_T = \epsilon_0 \cdot \epsilon_{ox} \cdot L \cdot W / t_{ox}$$

where L (μm) is the gate electrode length, W (μm) is the gate electrode width of the MIS thin-film semiconductor device for signal amplification, $t_{ox}$ (μm) is the gate insulator thickness, and $\in_D$ is the dielectric constant of the gate insulator. Here $\in_0$ is the permittivity in vacuum. Moreover, the element capacitance $C_D$ of the signal detection element is defined by the equation:

$$C_D = \in_0 \cdot \in_D \cdot S / t_D$$

where S ($\mu m^2$) is the area of a capacitance detecting electrode, $t_D$ ($\mu m$) is the thickness of the capacitance detecting dielectric layer, $\in_D$ is the dielectric constant of the capacitance detecting dielectric layer, and $\in_0$ is the permittivity in vacuum.

Figure 5A:
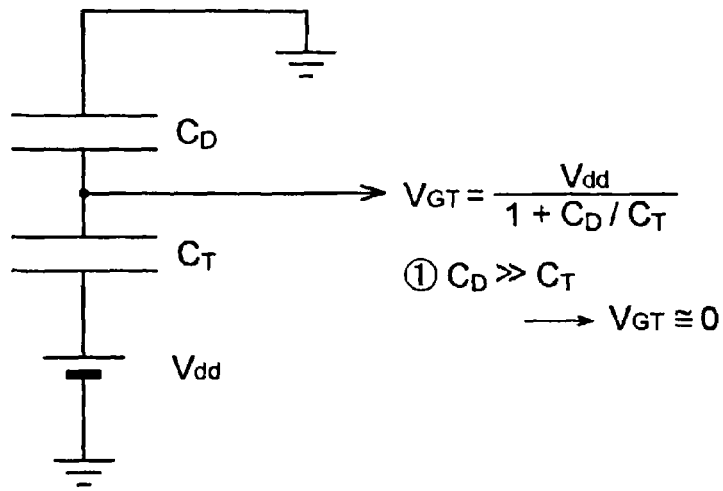
FIGS. 5A and 5B are schematics illustrating the principle of the present invention.

The surface of the target object serves as the earth electrode of the element capacitance $C_D$ and the capacitance detecting electrode corresponds to the other electrode. A capacitance detecting dielectric layer is interposed between the two electrodes. Since the capacitance detecting electrode is connected to the gate electrode of the MIS thin-film semiconductor device for signal amplification, the capacitor having the transistor capacitance $C_T$ and the capacitor having the element capacitance $C_D$ are connected in series. Voltage $V_{dd}$ is applied to these two series capacitors (FIG. 5A). The applied voltage is divided in accordance to the electrostatic capacitance. Hence, in this state the voltage $V_{GT}$ applied to the gate electrode of the MIS thin-film semiconductor device for signal amplification is as shown in Equation 1.

$$V_{GT} = \frac{V_{dd}}{1 + C_D / C_T} \quad \text{[Equation 1]}$$

Therefore, when the element capacitance $C_D$ is sufficiently larger than the transistor capacitance $C_T$ as in Equation 2, $$C_D \gg C_T \quad \text{[Equation 2]}$$

gate voltage is approximated as shown in Equation 3.

$$V_{GT} \approx 0 \quad \text{[Equation 3]}$$

Almost no voltage is applied to the gate electrode. As a result, the MIS thin-film semiconductor device for signal amplification is in the OFF state, and the current I is extremely small. Ultimately, the signal amplifying element should release almost no current when the ridge of a target object corresponding to the ridge of a fingerprint contacts the electrostatic capacitance detection device. Hence, in order to attain that, the gate electrode length, gate electrode width, gate insulator material, gate insulator thickness, capacitance detecting electrode, capacitance detecting dielectric layer material, and capacitance detecting dielectric layer thickness that includes the electrostatic capacitance detecting element must be appropriately set so that the element capacitance $C_D$ is sufficiently larger than the transistor capacitance $C_T$. In general, "sufficiently larger" means a difference in magnitude of about 10 times or greater. In other words, the element capacitance $C_D$ and the transistor capacitance $C_T$ should satisfy the following relationship:

$$C_D > 10 \times C_T$$

In this case, $V_{GT}/V_{dd}$ is approximately 0.1 or less, and the thin-film semiconductor device cannot enter the ON state. For the ridges of a target object to be accurately detected, it is important that the MIS thin-film semiconductor device for signal amplification be in the OFF state when the ridges of the target object contact the electrostatic capacitance detection device. Therefore, if a positive power supply is used for the power supply voltage $V_{dd}$, an N-type enhancement mode transistor (normally off type), which does not release drain current at a gate voltage near zero, is preferably used as the MIS thin-film semiconductor device for signal amplification. More ideal is to use an N-type MIS thin-film semiconductor device for signal amplification in which the minimum gate voltage satisfies the relationship:

$$0 < V_{min} < 0.1 \times V_{dd}$$

where $V_{min}$ is the gate voltage (minimum gate voltage) at which the minimum drain current in transfer characteristics is reached. Conversely, if a negative power supply is used for the power supply voltage $V_{dd}$, a P-type enhancement mode transistor (normally off type), which does not release drain current at a gate voltage near zero, is used as the MIS thin-film semiconductor device for signal amplification. More ideal is to use a P-type MIS thin-film semiconductor device for signal amplification in which the minimum gate voltage $V_{min}$ of the P-type MIS thin-film semiconductor device for signal amplification satisfies the relationship:

$$0.1 \times V_{dd} < V_{min} < 0$$

This relationship enables the ridges of the target object to be accurately detected under the situation where the current value I is extremely small.

Figure 5B:
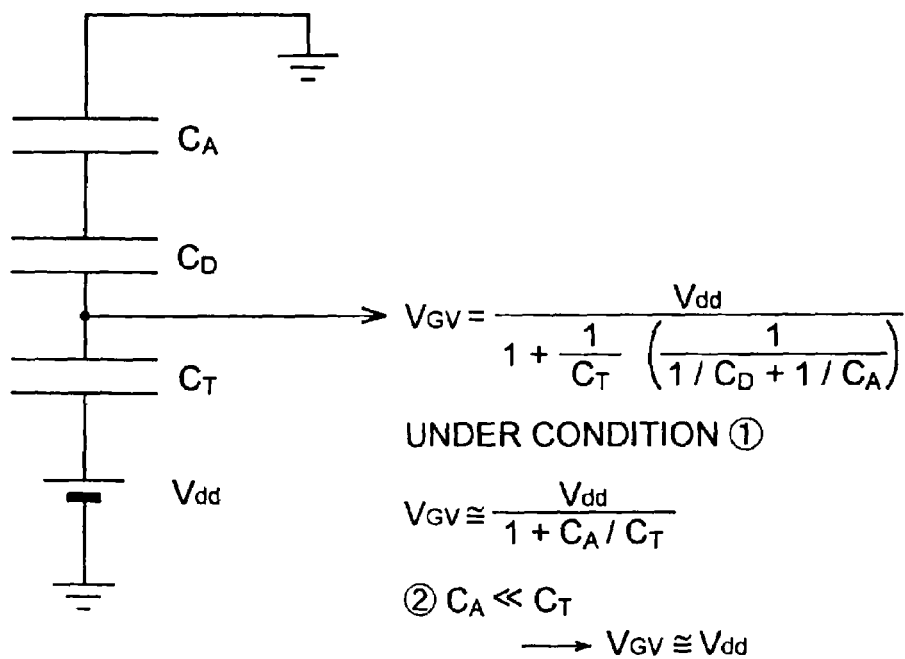

Next, a situation is considered where the target object is not in contact with, and instead is separated from, the capacitance detecting dielectric layer by a target object distance $t_A$. In other words, the valleys of the target object to be measured are above the capacitance detecting dielectric layer and, moreover, the target object is electrically grounded. Specifically imagined is the detection of a valley in a fingerprint that is present over the surface of the electrostatic capacitance detection device when the electrostatic capacitance detection device is used as a fingerprint sensor. As stated above, in the electrostatic capacitance detection device of the present invention, the capacitance detecting dielectric layer is preferably located on the uppermost surface of the electrostatic capacitance detection device. An equivalent circuit diagram in this case is shown in FIG. 5B. Since the surface of the target object is not in contact with the capacitance detecting dielectric layer, a new capacitor with air as the dielectric is formed between the capacitance detecting dielectric layer and the target object surface. This is called a target object capacitance $C_A$ and is defined as follows:

$$C_A = \in_0 \cdot \in_A \cdot S / t_A$$

where $\in_0$ is the permittivity in vacuum, $\in_A$ is the dielectric constant of air, and S is the area of the capacitance detecting electrode. When such a target object is separated from the capacitance detecting dielectric layer, three capacitors having a transistor capacitance $C_T$, an element capacitance $C_D$, and a target object capacitance $C_A$ are connected in series, and voltage $V_{dd}$ is applied to these three capacitors (FIG. 5B). The applied voltage is divided among the three capacitors in response to the electrostatic capacitance. Here, therefore, voltage $V_{GV}$, which is applied to the gate electrode of the MIS thin-film semiconductor device for signal amplification, is as shown in Equation 4.

$$V_{GV} = \frac{V_{dd}}{1 + \frac{1}{C_T} \cdot \left( \frac{1}{1/C_D + 1/C_A} \right)} \quad \text{[Equation 4]}$$

On the other hand, in the present invention, the electrostatic capacitance detecting element is formed such that the conditions in Equation 5 are satisfied.

$$C_D \gg C_T \quad \text{[Equation 5]}$$

This is done so that the drain current is extremely small when the target object contacts the electrostatic capacitance detection device. Therefore, $V_{GV}$ is approximated by Equation 6.

$$V_{GV} \approx \frac{Vdd}{1 + C_A/C_T} \quad \text{[Equation 6]}$$

Ultimately, if the transistor capacitance $C_T$ is sufficiently larger than the target object capacitance $C_A$ as in Equation 7, $$C_T \gg C_A \quad \text{[Equation 7]}$$

then the gate voltage $V_{GV}$ is expressed by Equation 8, $$V_{GV} \approx V_{dd} \quad \text{[Equation 8]}$$

and the gate voltage $V_{GV}$ is nearly equal to the power supply voltage $V_{dd}$. As a result, the MIS thin-film semiconductor device for signal amplification can be placed into the ON state and an extremely large current I is obtained. In order for the signal amplifying element to conduct a large current when a valley of a target object corresponding to the valley of a fingerprint is present over the electrostatic capacitance detection device, the gate electrode length, gate electrode width, gate insulator material, gate insulator thickness and so forth that comprise the signal amplifying element must be appropriately set so that the transistor capacitance $C_T$ is sufficiently larger than the target object capacitance $C_A$. As stated above, since a difference in magnitude of about 10 times is generally considered "sufficiently larger," the transistor capacitance $C_T$ and the target object capacitance $C_A$ should satisfy the following relationship:

$$C_T > 10 \times C_A$$

In this case, the $V_{GT}/V_{dd}$ is approximately 0.91 or greater, and the thin-film semiconductor device easily enters the ON state. In order for a valley of a target object to be accurately detected, it is important that the MIS thin-film semiconductor device for signal amplification be in the ON state when the valley of the target object approaches the electrostatic capacitance detection device. If a positive power supply is used for the power supply voltage $V_{dd}$, an N-type enhancement mode transistor (normally off type) is used as the MIS thin-film semiconductor device for signal amplification. The threshold voltage $V_{th}$ of this transistor is preferably smaller than the $V_{GV}$. More ideal is to use an N-type MIS thin-film semiconductor device for signal amplification that satisfies the following relationship:

$$0 < V_{th} < 0.91 \times V_{dd}$$

Conversely, if a negative power supply is used for the power supply voltage $V_{dd}$, a P-type enhancement mode transistor (normally off type) is used as the MIS thin-film semiconductor device for signal amplification. Ideally, the threshold voltage $V_{th}$ of the signal-amplifying P-type MIS thin-film semiconductor device is preferably larger than the $V_{GV}$. More ideal is to use a signal-amplifying P-type MIS thin-film semiconductor device that satisfies the following relationship:

$$0.91 \times V_{dd} < V_{th} < 0$$

This relationship enables the valleys of the target object to be accurately detected under the situation where the current value I is extremely large.

Ultimately, correct recognition of the ridges and valleys in the target object requires that the signal amplifying element conducts almost no current when a ridge of the target object, which corresponds to a ridge in an object, such as a fingerprint, contacts the electrostatic capacitance detection device. At the same time, correct recognition of the ridges and valleys in the target object requires that the signal amplifying element conducts a large current when a valley in the target object, which corresponds to a valley in an object such as a fingerprint, is over the electrostatic capacitance detection device. Therefore, to achieve correct recognition of the ridges and valleys, the capacitance detecting dielectric layer in the electrostatic capacitance detecting element must be positioned on the uppermost surface of the electrostatic capacitance detection device. Moreover, the gate electrode length L (µm) and the gate electrode width W (µm) of the MIS thin-film semiconductor device for signal amplification, the thickness $t_{ox}$ (µm) of the gate insulator, the dielectric constant $\in_{ox}$ of the gate insulator, the capacitance detecting electrode area S (µm$^2$), the thickness $t_D$ (µm) of the capacitance detecting dielectric layer, and the dielectric constant $\in_D$ of the capacitance detecting dielectric layer must all be appropriately set so that the clement capacitance $C_D$ is sufficiently larger than the transistor capacitance $C_T$. Further still, it is ideal that the electrostatic capacitance detection device be configured so that the transistor capacitance $C_T$ is sufficiently larger than the target object capacitance $C_A$ when the target object is not in contact with the capacitance detecting dielectric layer but is separated by the target object distance $t_A$. More specifically, the electrostatic capacitance detection device is provided such that the element capacitance $C_D$, the transistor capacitance $C_T$, and the target object capacitance $C_A$ satisfy the following relationship:

$$C_D > 10 \times C_T > 100 \times C_A$$

In addition, if a positive power supply is used for the power supply voltage $V_{dd}$, an N-type enhancement mode transistor (normally off type) is preferably used as the MIS thin-film semiconductor device for signal amplification. It is ideal to use an N-type enhancement mode transistor, where the minimum gate voltage satisfies the following relationship:

$$0 < V_{min} < 0.1 \times V_{dd}$$

and, moreover, where the threshold voltage $V_{th}$ is smaller than the $V_{GV}$, and, specifically, satisfies the following relationship:

$$0 < V_{th} < 0.91 \times V_{dd}$$

Conversely, if a negative power supply is used for the power supply voltage $V_{dd}$, a P-type enhancement mode transistor (normally off type) is preferably used as the MIS thin-film semiconductor device for signal amplification. It is ideal to use a P-type enhancement mode transistor, where the minimum gate voltage satisfies the following relationship:

$$0.1 \times V_{dd} < V_{min} < 0$$

and, moreover, where the threshold voltage $V_{th}$ is larger than the $V_{GV}$, and, specifically, satisfies the following relationship:

$$0.91 \times V_{dd} < V_{th} < 0$$

Figure 6:
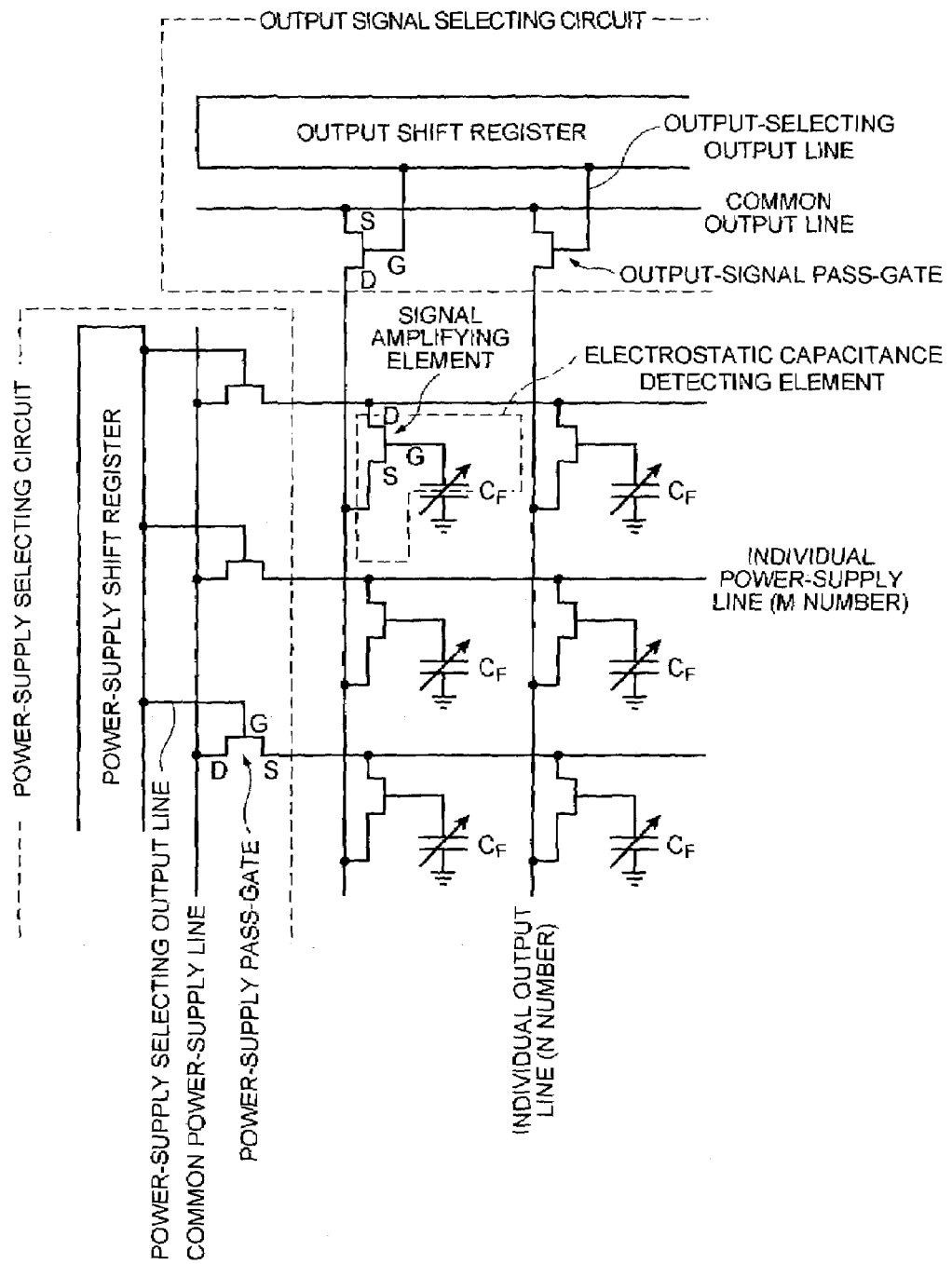
FIG. 6 is a schematic illustrating the overall configuration of the present invention.

Next, the overall configuration of an electrostatic capacitance detection device according to the present invention is described with reference to FIG. 6. An electrostatic capacitance detection device that reads the surface contours of a target object has, as minimum constituent elements, an M number (M is an integer of 1 or more) of individual power-supply lines and an N number (N is an integer of 1 or more) of individual output lines arranged in a matrix of M rows and N columns; and an electrostatic capacitance detecting element formed at each intersection between the individual power-supply line and the individual output line. In addition, an electrostatic capacitance detection device according to the present invention may be equipped with either or both a power-supply selecting circuit connected to the M number of individual power-supply lines and the output signal selecting circuit connected to the N number of individual output lines. The electrostatic capacitance detecting element, which includes a capacitance detecting electrode, a capacitance detecting dielectric layer, and a signal amplifying element, detects electrostatic capacitance, which changes according to distance from the target object. The electrostatic capacitance detection elements are arranged in a matrix of M rows and N columns. Therefore, for the surface contours of a target object to be read, the rows and columns, respectively, must be sequentially scanned, and an M×N number of electrostatic capacitance detecting element must be selected in a suitable order. The power-supply selecting circuit detemiines the sequence in which to supply power to the electrostatic capacitance detection elements. The power-supply selecting circuit, which includes at least the common power-supply line and the power-supply pass-gate, selects the M number of individual power-supply lines to which to supply power. In contrast to this, it is the output signal selecting circuit that determines the sequence in which to read the detected signals from the electrostatic capacitance detection elements. The output signal selecting circuit, which includes at least a common output line and an output-signal pass-gate, selects which of the N number of individual output lines from which to extract the output signal.

The signal amplifying element within the electrostatic capacitance detecting element includes an MIS thin-film semiconductor device for signal amplification that includes a gate electrode, a gate insulator, and a semiconductor layer. In addition, the power-supply pass-gate includes a thin-film semiconductor device for a power-supply pass-gate that includes a gate electrode, a gate insulator, and a semiconductor layer. Moreover, the output-signal pass-gate comprises an MIS thin-film semiconductor device for an output-signal pass-gate that includes a gate electrode, a gate insulator, and a semiconductor layer. In the present invention the source region of the MIS thin-film semiconductor device for signal amplification is connected to an individual output line; the drain region of the MIS thin-film semiconductor device for signal amplification is connected to an individual power-supply line; and the gate electrode of the MIS thin-film semiconductor device for signal amplification is connected to a capacitance detecting electrode. (In FIG. 6, source regions in an MIS thin-film semiconductor device are labeled "S", drain regions are labeled "D" and gate electrodes are labeled "G.") Thus, the individual power-supply line and the individual output line are connected to one another with the interposition of a channel-forming region that responds to the charge Q detected at the capacitance detecting electrode.

On the other hand, the source region of the thin-film semiconductor device for a power-supply pass-gate is connected to an individual power-supply line; the drain region of the thin-film semiconductor device for a power-supply pass-gate is connected to the common power-supply line; and the gate electrode of the thin-film semiconductor device for the power-supply pass-gate is connected to the output line for power-supply selection, which supplies a signal that determines which individual power-supply line is selected from the M number of individual power-supply lines. As just one example, the output lines for power-supply selection can be output stages for signals from the power-supply shift register (in the case of FIG. 6), or they can be output stages for signals of a power-supply decoder instead of a power-supply shift register. A power-supply shift register sequentially supplies selected signals received from the M number of output stages. Also, a power-supply decoder selects a specific output stage from the M number of output stages according to the signal input to the decoder. Thus, sequentially selected signals are input to the M number of power-supply pass-gates and, as a result, the M number of individual power-supply lines become sequentially conductive with the common power-supply line. The drain region of an MIS thin-film semiconductor device for signal amplification is connected to an individual power-supply line. Therefore, the signal amplifying elements that are connected to the selected individual power-supply lines simultaneously supply current to each individual output line in response to the surface contours of the target object.

In the present invention, the source region of an MIS thin-film semiconductor device for an output-signal pass-gate is connected to a common output line; the drain region of an MIS thin-film semiconductor device for an output-signal pass-gate is connected to an individual output line; and the gate electrode of an MIS thin-film semiconductor device for an output-signal pass-gate is connected to an output line for output selection that supplies a signal that determines which individual output line is selected from the N number of individual output lines. As just one example, the output line for output selections can be output stages for signals from an output shift register (in the case of FIG. 6), or they can be output stages for signals of an output signal decoder instead of an output shift register.

An output shift register sequentially supplies selected signals received from the N number of output stages. Also, an output signal decoder selects a specific output stage from among the M number of output stages in response to the signal input to the decoder. Thus, signals selected in a sequential and timely fashion are input to the N number of output signal pass-gates and, as a result, the N number of individual output lines become sequentially conductive with the common output line. The source region of an MIS thin-film semiconductor device for signal amplification is connected to an individual output line. Therefore, of the N number of signal amplifying elements that connect to individual power-supply lines selected by the power-supply selecting circuit, only the signal amplifying element that connects to the individual output line selected by the output signal selecting circuit supplies current to the common output line in response to the surface contours of the target object. Thereafter, by similarly sequentially scanning the N number of individual output lines in a state where only one of the M number of individual output lines is selected, signals from the electrostatic capacitance detecting elements arranged in an array of M rows and N columns are sequentially supplied to the common output line.

In order for an electrostatic capacitance detection device thus configured to function, the individual output line, the common output line, and the output line for power-supply selection must be electrically connected by a first wire; the individual power-supply line, the common power-supply line, and the output line for output selection must be electrically connected through a second wire, and the first wire and the second wire must be electrically isolated by an insulator. The capacitance detecting electrode may be electrically connected by the first wire, or it may be electrically connected by the second wire. By using this kind of configuration, excess wiring is eliminated or reduced, and parasitic capacitance occurring between lines is minimized or reduced, thereby enabling extremely small electrostatic capacitances to be detected with high sensitivity.

Such an electrostatic capacitance detecting element can be formed on a plastic substrate using the aforementioned transfer technology. On plastic, a fingerprint sensor based on single-crystal silicon technology would promptly break or would have very little practical application, since it would not possess sufficient size. In contrast to this, an electrostatic capacitance detecting element formed on a plastic substrate according to the present invention will not break, even if the area on the plastic substrate is sufficiently large to cover a fingertip. Hence, the present invention can be used as a fingerprint sensor on a plastic substrate. Specifically, the present invention enables the realization of a smart card equipped with a personal identification function. Used in cash cards (bank cards), credit cards, identify cards, and so forth, smart cards equipped with a personal identification function have the superior feature of not only markedly enhancing the security level of these cards, but also of protecting personal fingerprint information from being released outside the card.

EXAMPLE 1

An electrostatic capacitance detection device made up of thin-film semiconductor devices was fabricated on a glass substrate. The fabricated electrostatic capacitance detection device was then transferred to a plastic substrate using the technology disclosed in Japanese Laid Open to the Public No. Hei 11-312811 and by S. Utsunomiya et. al in *Society for Information Display*, p. 916 (2000). An electrostatic capacitance detection device was thus produced on a plastic substrate. The electrostatic capacitance detection device includes electrostatic capacitance detecting elements aligned in a matrix of 400 rows and 400 columns. The array is a square having a diagonal measurement of 20.32 mm.

The substrate, made of poly-ether-sulfone (PBS), has a thickness of 400 µm. The MIS thin-film semiconductor device for signal amplification, the MIS thin-film semiconductor device for an output-signal pass-gate, the thin-film semiconductor device for a power-supply pass-gate, the MIS thin-film semiconductor device that includes the output shift register, and the MIS thin-film semiconductor device that comprises the power-supply shift register are all fabricated with thin-film transistors having the same cross-sectional structure. The thin-film transistors are a top-gate type, as shown in FIG. 4. They are fabricated in a low-temperature process where the maximum process temperature is 425° C. The semiconductor layer, a polycrystalline silicon thin-film achieved through laser crystallization, has a thickness of 59 nm. In addition, the gate insulator is a silicon-oxide layer having a thickness of 48 nm that was formed by chemical vapor deposition (CVD). The gate electrode includes a 400-nm-thick tantalum thin-film. The dielectric constant of the silicon-oxide film that forms the gate insulator was found to be approximately 3.9 according to CV measurement. The first interlayer dielectric and the second interlayer dielectric are silicon-oxide layers that were deposited by CVD using tetra-ethyl-ortho-silicate (TEOS: Si (O CH$_2$ CH$_3$)$_4$) and oxygen as source gases. The first interlayer dielectric is approximately at least 20% thicker than the gate electrode (400 nm in this embodiment) and is preferably thinner than the second interlayer dielectric. This is because, when made this way, the first interlayer dielectric completely covers the gate electrode, prevents short-circuits between the gate electrode and the first wire or the second wire, and at the same time enables the second interlayer dielectric to be deposited to a greater thickness. In this embodiment, the thickness of the first interlayer dielectric was 500 nm. The second interlayer dielectric is isolated from the first wire and the capacitance detecting electrode. Therefore, to minimize or reduce the parasitic capacitance that exists between the first wire and the capacitance detecting electrode and to realize a highly sensitive electrostatic capacitance detection device, the permittivity of the second interlayer dielectric is preferably as small as possible and the thickness is preferably as thick as possible. However, if the total thickness of the silicon-oxide layer deposited by CVD exceeds about 2 µm, fissures may develop in the oxide layer, bringing reduced yield. Therefore, the first interlayer dielectric and the second interlayer dielectric are deposited such that the sum of their respective thicknesses is approximately 2 µm or less. Thus, the ease with which the electrostatic capacitance detection device can be produced is enhanced. As stated above, the second interlayer dielectric is preferably thick, and thus is made thicker than the first interlayer dielectric. Ideally, the first interlayer dielectric is approximately at least 20% thicker than the gate electrode, the second interlayer dielectric is thicker than the first interlayer dielectric, and the sum of the thickness of the first interlayer dielectric and the second interlayer dielectric is approximately 2 µm or less. In this exemplary embodiment, the thickness of the second interlayer dielectric is 1 µn. The first wire and the second wire are both made of 500-nm-thick aluminum. The wires are 5 µm in width. The output line for power-supply selection, the common output line, and the individual output line were formed by the first wire. The individual power-supply line, common power-supply line, output line for output selection, and capacitance detecting electrode were formed by the second wire. The gap between an individual power-supply line and a capacitance detecting electrode is 5 µm. Likewise, the gap between an individual output line and a capacitance detecting electrode is also 5 µm. in this exemplary embodiment, the pitch of the rows and columns that form the electrostatic capacitance detection device is 50.8 µm, and the resolution is 500 dpi (dots per inch). Therefore, a capacitance detecting electrode is 40.8 µm×40.8 µm in size. The capacitance detecting dielectric layer is formed by a silicon-nitride layer having a thickness of 400 nm. Since CV measurement showed the dielectric constant of the silicon-nitride layer to be approximately 7.5, the element capacitance C$_D$ is approximately 276 fF (femtofarad).

Assuming that the electrostatic capacitance detection device of this exemplary embodiment is a fingerprint sensor, since the difference in height between the ridges and valleys in a fingerprint is approximately 40 µm, the target object capacitance C$_A$ when a valley in a fingerprint is present over the surface of the electrostatic capacitance detection device is calculated to be 0.368 fF. On the other hand, because the gate electrode length L of the MIS thin-film semiconductor device for signal amplification was set to 4 µm, and the gate electrode width W was set to 5 µm, the transistor capacitance C$_T$ is approximately 14.4 fF. Thus, the electrostatic capacitance detecting element described in this embodiment satisfies the following relationship:

$$C_D>10\times C_T>100\times C_A$$

Thus, if the power supply voltage $V_{dd}$ is 3.3V, then 0.16V is the voltage $V_{GT}$ applied to a gate electrode of an MIS thin-film semiconductor device for signal amplification when ridges in a fingerprint touch the surface of the electrostatic capacitance detection device; and 3.22V is the voltage $V_{GV}$ applied to this gate electrode when a valley in a fingerprint is present.

Figure 7:
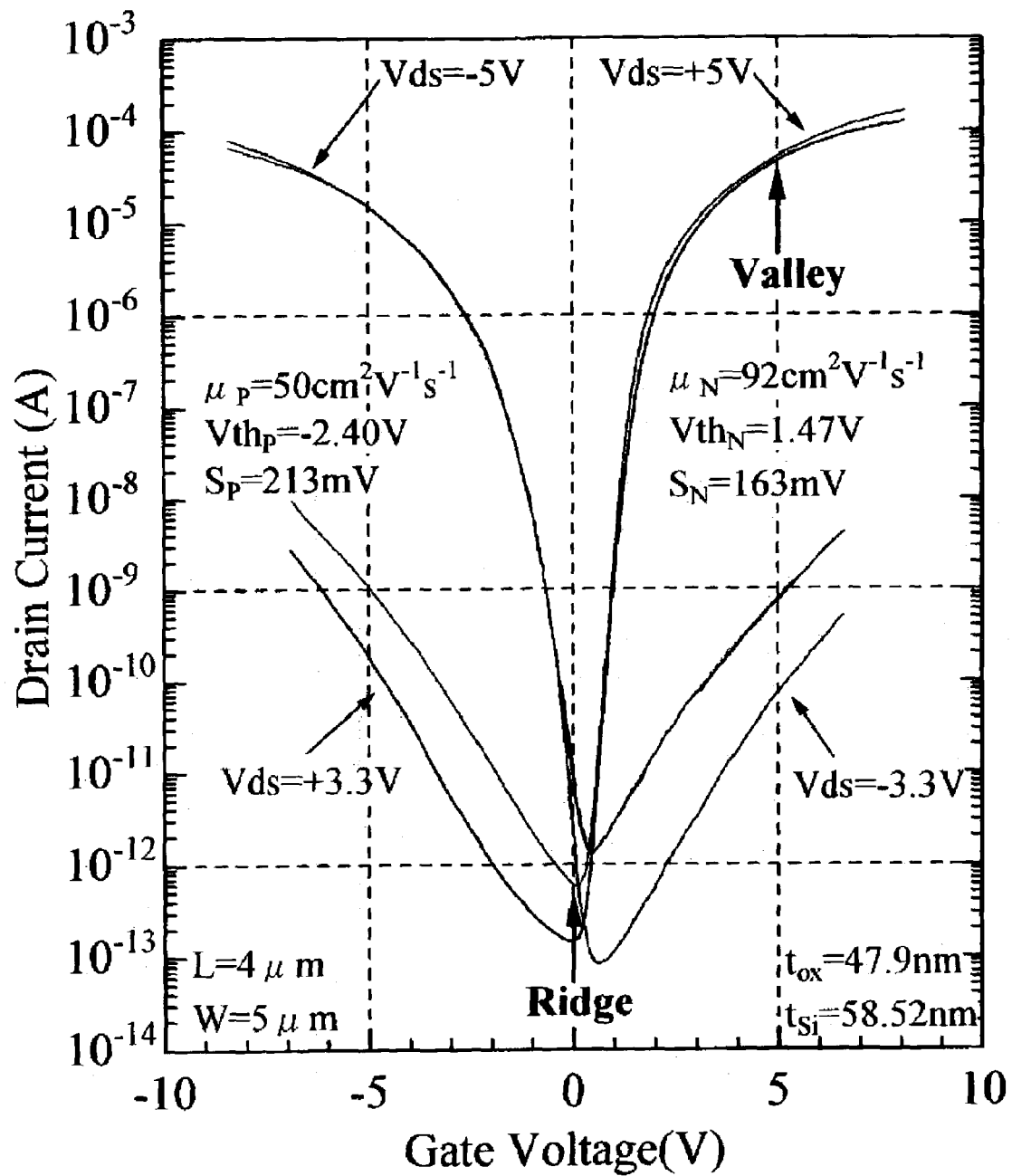
FIG. 7 is a graph showing the transfer characteristics of the thin-film semiconductor device used in a preferred exemplary embodiment of the present invention.

FIG. 7 illustrates the transfer characteristics of an MIS thin-film semiconductor device used in this exemplary embodiment. The output shift register and the power-supply shift register have a CMOS structure; the MIS thin-film semiconductor device for signal amplification, the thin-film semiconductor device for a power-supply pass-gate, and the MIS thin-film semiconductor device for an output-signal pass-gate are provided with NMOS transistors. The minimum gate voltage $V_{min}$ of the N-type MIS thin-film semiconductor device for signal amplification is 0.1V and satisfies the following relationship:

$$0<V_{min}<0.1\times V_{dd}=0.33V$$

Moreover, the threshold voltage $V_{th}$ is 1.47V and, as expected, satisfies the following relationship:

$$0<V_{th}<0.91\times V_{dd}=3.00V$$

As a result, the current value that is output from a signal amplifying element when a ridge in a fingerprint touches the surface of the electrostatic capacitance detection device is, at $5.6\times10^{-13}$ A, exceedingly small. Conversely, when a valley in a fingerprint is present, a large current of $2.4\times10^{-5}$ A is output from the signal amplifying element. Hence ridge and valley information for objects, such as fingerprints, was detected with high accuracy and precision.

[Effects of the Invention]

As described in detail above, with the technology of the related art, which uses a single-crystal silicon wafer, only small electrostatic capacitance detection devices measuring approximately several millimeters by several millimeters can be formed on a plastic substrate. According to the present invention, however, an electrostatic capacitance detection device having an area some 100 times larger can be formed on a plastic substrate, and, moreover, is capable of extremely high-accuracy detection of ridge and valley information in a target object. The present invention can be used, for example, to markedly enhance the security level of a smart card. In addition, a related art electrostatic capacitance detection device formed on a single-crystal silicon wafer wastes a tremendous amount of energy and labor, because only an extremely small portion of the device area actually uses the single-crystal silicon semiconductor. In contrast to this, the present invention eliminates this kind of extravagant waste and has the effect of helping conserve the global environment.

What is claimed is:

1. An electrostatic capacitance detection device that reads surface contours of a target object by detecting electrostatic capacitance which changes according to a distance from the target object, the device comprising:

an M number of individual power-supply lines, and an N number of individual output lines arranged in a matrix of M rows and N columns;

an electrostatic capacitance detecting element formed at the intersection between the individual power-supply lines and the individual output lines, the electrostatic capacitance detecting element including a signal detection element and a signal amplifying element, the signal detection element including a capacitance detecting electrode and a capacitance detecting dielectric layer, and the signal amplifying element including an MIS thin-film semiconductor device for signal amplification, including a gate electrode, a gate insulator, and a semiconductor layer;

a source region of the MIS thin-film semiconductor device for signal amplification being connected to the individual output line;

a drain region of the MIS thin-film semiconductor device for signal amplification being connected to the individual power-supply line;

the gate electrode of the MIS thin-film semiconductor device for signal amplification being connected to the capacitance detecting electrode;

an element capacitance $C_D$ being sufficiently larger than a transistor capacitance $C_T$, the transistor capacitance $C_T$ of the MIS thin-film semiconductor device for signal amplification being defined by the equation:

$$C_T=\epsilon_0\cdot\epsilon_{ox}\cdot L\cdot W/t_{ox}$$

where L (μm) is the gate electrode length, W (μm) is the sate electrode width of the MIS thin-film semiconductor device for signal amplification, $t_{ox}$ (μm) is the thickness of the gate insulator, $\epsilon_{ox}$ is the dielectric constant of the gate insulator, and $\epsilon_0$ is the permittivity in vacuum; and the element capacitance $C_D$ of the signal detection element is defined by the equation:

$$C_D=\epsilon_0\cdot\epsilon_D\cdot S/t_D$$

where S (μm$^2$) is the area of a capacitance detecting electrode, $t_D$ (μm) is the thickness of the capacitance detecting dielectric layer, $\epsilon_D$ is the dielectric constant of the capacitance detecting dielectric layer, and $\epsilon_0$ is the pennittivity in vacuum.

2. The electrostatic capacitance detection device according to claim 1, the capacitance detecting dielectric layer being located on the uppermost surface of the electrostatic capacitance detection device.

3. The electrostatic capacitance detection device according to claim 2, the target object not being in contact with but is separated from the capacitance detecting dielectric layer by a target object distance $t_A$, and the transistor capacitance $C_T$ being sufficiently larger than target object capacitance $C_A$, when the target object capacitance $C_A$ is defined by the equation:

$$C_A=\epsilon_0\cdot\epsilon_A\cdot S/t_A$$

where $\epsilon_A$ is the dielectric constant of air.

4. An electrostatic capacitance detection device that reads surface contours of a target object by detecting electrostatic capacitance which changes according to a distance from the target object, the device comprising:

an M number of individual power-supply lines, and an N number of individual output lines arranged in a matrix of M rows and N columns;

an electrostatic capacitance detecting element formed at the intersection between the individual power-supply lines, and the individual output lines, the electrostatic capacitance detecting element including a capacitance detecting electrode, a capacitance detecting dielectric layer, and a signal amplifying element, the signal amplifying element including an MIS thin-film semiconductor device for signal amplification, including a gate electrode, a gate insulator, and a semiconductor layer, a power-supply selecting circuit connected to the M number of individual power-supply lines, the power-supply selecting circuit including a common power-supply line and a power-supply pass-gate, the power-supply pass-gate including an MIS thin-film semiconductor device for a power-supply pass-gate, including a gate electrode, a gate insulator, and a semiconductor layer;

a source region of the MIS thin-film semiconductor device for signal amplification being connected to the individual output line;

a drain region of the MIS thin-film semiconductor device for signal amplification being connected to the individual power-supply line;

the gate electrode of the MIS thin-film semiconductor device for signal amplification being connected to the capacitance detecting electrode;

a source region of the MIS thin-film semiconductor device for a power-supply pass-gate being connected to the individual power-supply line; and a drain region of the MIS thin-film semiconductor device for a power-supply pass-gate being connected to the common power-supply line.

5. The electrostatic capacitance detection device according to claim 4, the gate electrode of the MIS thin-film semiconductor device for a power-supply pass-gate being connected to an output line for power-supply selection.

6. The electrostatic capacitance detection device according to claim 5, the individual output line and the output line for power-supply selection being electrically connected by a first wire;

the individual power-supply line and the common power-supply line being electrically connected by a second wire; and the first wire and the second wire being electrically isolated from one another by an insulator.

7. The electrostatic capacitance detection device according to claim 6, the capacitance detecting electrode being electrically connected by the first wire.

8. The electrostatic capacitance detection device according to claim 6, the capacitance detecting electrode being electrically connected by the second wire.

9. An electrostatic capacitance detection device that reads surface contours of a target object by detecting electrostatic capacitance which changes according to a distance from the target object, the device comprising:

an M number of individual power-supply lines and an N number of individual output lines arranged in a matrix of M rows and N columns;

an electrostatic capacitance detecting element formed at the intersection between the individual power-supply lines and the individual output lines, the electrostatic capacitance detecting element including a capacitance detecting electrode, a capacitance detecting dielectric layer, and a signal amplifying element, the signal amplifying element including an MIS thin-film semiconductor device for signal amplification, including a gate electrode, a gate insulator, and a semiconductor layer; and an output signal selecting circuit connected to the N number of individual output lines, the output signal selecting circuit including a common output line and an output-signal pass-gate, the output-signal pass-gate including an MIS thin-film semiconductor device for an output-signal pass-gate, including a gate electrode, a gate insulator, and a semiconductor layer;

a source region of the MIS thin-film semiconductor device for signal amplification being connected to the individual output line;

a drain region of the MIS thin-film semiconductor device for sianal amplification being connected to the individual power-supply line;

the gate electrode of the MIS thin-film semiconductor device for signal amplification being connected to the capacitance detecting electrode;

a source region of the MIS thin-film semiconductor device for an output-signal pass-gate being connected to the common output line; and a drain region of the MIS thin-film semiconductor device for an output-signal pass-gate being connected to the individual output line.

10. The electrostatic capacitance detection device according to claim 9, the gate electrode of the MIS thin-film semiconductor device for an output-signal pass-gate being connected to an output line for output selection.

11. The electrostatic capacitance detection device according to claim 10, the individual output line and the common output line being electrically connected through a first wire;

the individual power-supply line and the output line for output selection being electrically connected through a second wire; and the first wire and the second wire being electrically isolated from one another by an insulator.

12. The electrostatic capacitance detection device according to claim 11, the capacitance detecting electrode being electrically connected by the first wire.

13. The electrostatic capacitance detection device according to claim 11, the capacitance detecting electrode being electrically connected by the second wire.

14. An electrostatic capacitance detection device that reads surface contours of a target object by detecting electrostatic capacitance which changes according to a distance from the target object, the device comprising:

an M number of individual power-supply lines, and an N number of individual output lines arranged in a matrix of M rows and N columns;

an electrostatic capacitance detecting element formed at the intersection between the individual power-supply lines and the individual output lines, the electrostatic capacitance detecting element including a capacitance detecting electrode, a capacitance detecting dielectric layer, and a signal amplifying element, the signal amplifying element including an MIS thin-film semiconductor device for signal amplification, including a gate electrode, a gate insulator, and a semiconductor layer, a power-supply selecting circuit connected to the M number of individual power-supply lines, the power-supply selecting circuit including a common power-supply line and a power-supply pass-gate, the power-supply pass-gate including an MIS thin-film semiconductor device for a power-supply pass-gate including a gate electrode, a gate insulator, and a semiconductor layer, and an output signal selecting circuit connected to the N number of individual output lines, the output signal selecting circuit including a common output line and an output-signal pass-gate, the output-signal pass-gate including an MIS thin-film semiconductor device for an output-signal pass-gate including a gate electrode, a gate insulator and a semiconductor layer;

a source region of the MIS thin-film semiconductor device for signal amplification being connected to the individual output line, a drain region of the MIS thin-film semiconductor device for signal amplification being connected to the individual power-supply line, the gate electrode of the MIS thin-film semiconductor device for signal amplification being connected to the capacitance detecting electrode, a source region of the thin-film semiconductor device for a power-supply pass-gate being connected to the individual power-supply line, a drain region of the thin-film semiconductor device for a power-supply pass-gate being connected to the common power-supply line, a source region of the MIS thin-film semiconductor device for an output-signal pass-gate being connected to the common output line, and a drain region of the MIS thin-film semiconductor device for an output-signal pass-gate being connected to the individual output line.

15. The electrostatic capacitance detection device according to claim 14, the gate electrode of the thin-film semiconductor device for a power-supply pass-gate being connected to an output line for power-supply selection; and the gate electrode of the MIS thin-film semiconductor device for an output-signal pass-gate being connected to an output line for output selection.

16. The electrostatic capacitance detection device according to claim 15, the individual output line, the common output line, and the output line for power-supply selection being electrically connected by a first wire;

the individual power-supply line, the common power-supply line, and the output line for output selection being electrically connected by a second wire; and the first wire and the second wire being electrically isolated from one another by an insulator.

17. The electrostatic capacitance detection device according to claim 16, the capacitance detecting electrode being electrically connected by the first wire.

18. The electrostatic capacitance detection device according to claim 16, the capacitance detecting electrode being electrically connected by the second wire.

* * * * *